(12) United States Patent
Carkner

(10) Patent No.: US 8,138,723 B2
(45) Date of Patent: Mar. 20, 2012

(54) REMOTE BATTERY CHARGING SYSTEM WITH DYNAMIC VOLTAGE ADJUSTMENT AND METHOD OF USE

(76) Inventor: Steve Carkner, Ottawa (CA)

( * ) Notice: Subject to any disclaimer, the term of this patent is extended or adjusted under 35 U.S.C. 154(b) by 888 days.

(21) Appl. No.: 12/126,973

(22) Filed: May 26, 2008

(65) Prior Publication Data

US 2009/0289604 A1    Nov. 26, 2009

(51) Int. Cl.
*H02J 7/00*    (2006.01)
*H02J 7/04*    (2006.01)
*H02J 7/16*    (2006.01)

(52) U.S. Cl. ........ 320/137; 320/128; 320/140; 320/143; 320/148; 320/152

(58) Field of Classification Search .................... 320/137
See application file for complete search history.

(56) References Cited

U.S. PATENT DOCUMENTS

| 5,182,510 | A  | * | 1/1993 | Nakamura | 322/21 |
| 6,172,481 | B1 | * | 1/2001 | Curtiss | 320/127 |
| 6,414,465 | B1 | * | 7/2002 | Banks et al. | 320/118 |
| 6,789,026 | B2 | * | 9/2004 | Barsoukov et al. | 702/63 |
| 7,030,686 | B2 | * | 4/2006 | Itoh | 327/541 |

* cited by examiner

*Primary Examiner* — Edward Tso
*Assistant Examiner* — Ahmed Omar
(74) *Attorney, Agent, or Firm* — Gordon Thomson

(57) ABSTRACT

In a remote battery charging system comprising a charging circuit there is always a voltage loss due to inherent resistances in the system from such things as connectors and conductors. These resistances create voltages losses in the system such that charging time are increased substantially. The present invention compensates for voltage losses on the system by generating a dynamic adjustment voltage over the charging period. A voltage translator circuit is used to measure charging circuit output voltage and current over a plurality of incremental time periods during the charging period an calculate a signal proportional to changes in output voltage and current over the incremental time period. The signal is then applied to the charging circuit to offset any voltage losses.

11 Claims, 14 Drawing Sheets

FIGURE 10

200 Connecting said at least one battery to said charging circuit by a positive conductor and a ground conductor wherein said positive and ground conductors have an aggregate inherent resistance $R_i$, causing an aggregate voltage loss $V_i$ at a current level of $I_o$

204 Connecting said thermistor between the second ground conductor and a third conductor

206 Connecting a microprocessor to said third conductor

208 Connecting an A/D converter serially between said third conductor and said microprocessor

210 Applying a bias current $I_{bias}$ to the third conductor for measuring resistance within the thermistor

212 Terminating $I_{bias}$

214 Measuring a voltage loss $V_3$ in the third conductor

216 Calculating $V_{off}$ based upon $V_3$ such that $V_{off} = 2V_3$

218 Dynamically adjusting $V_{ri}$ by $V_{off}$

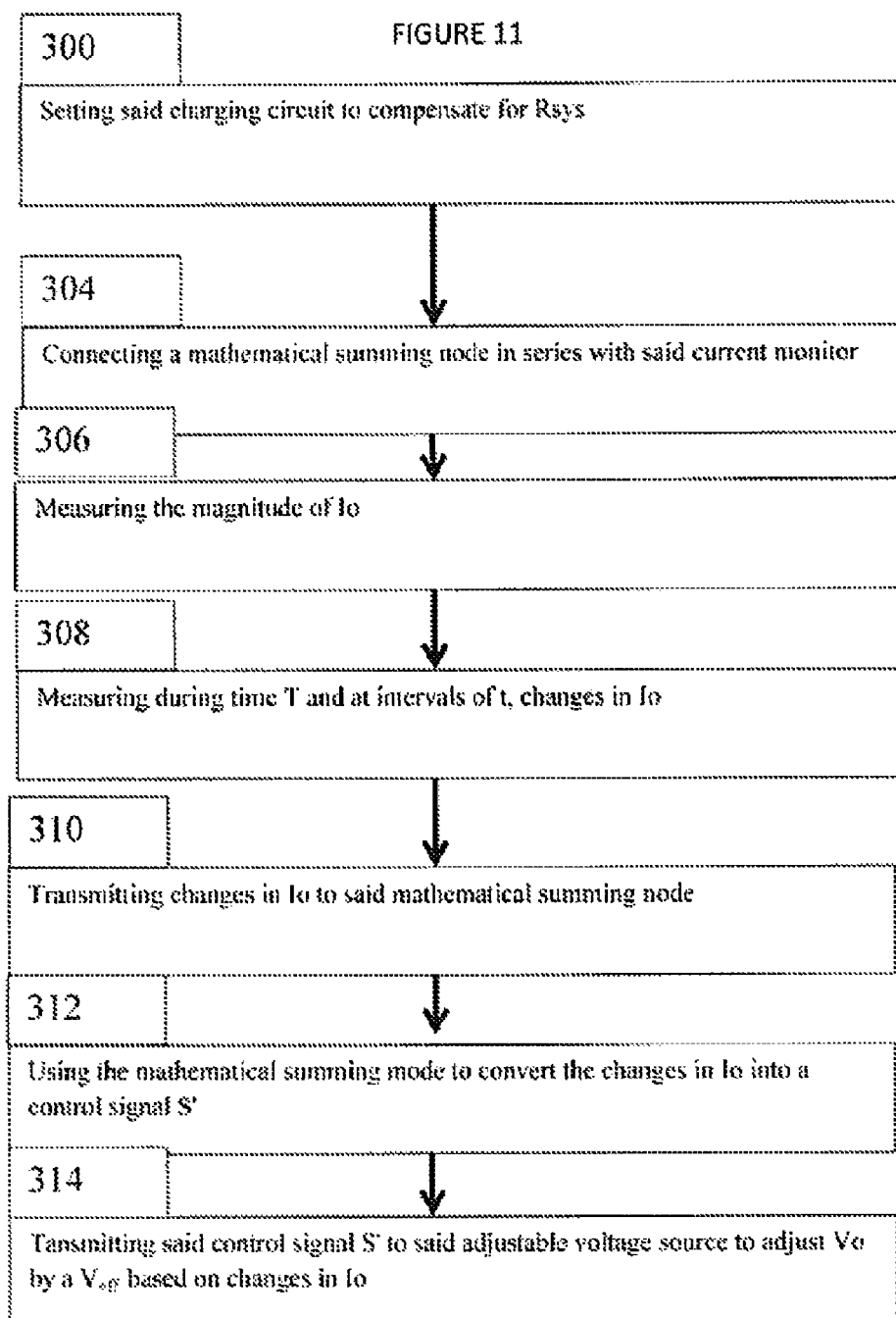

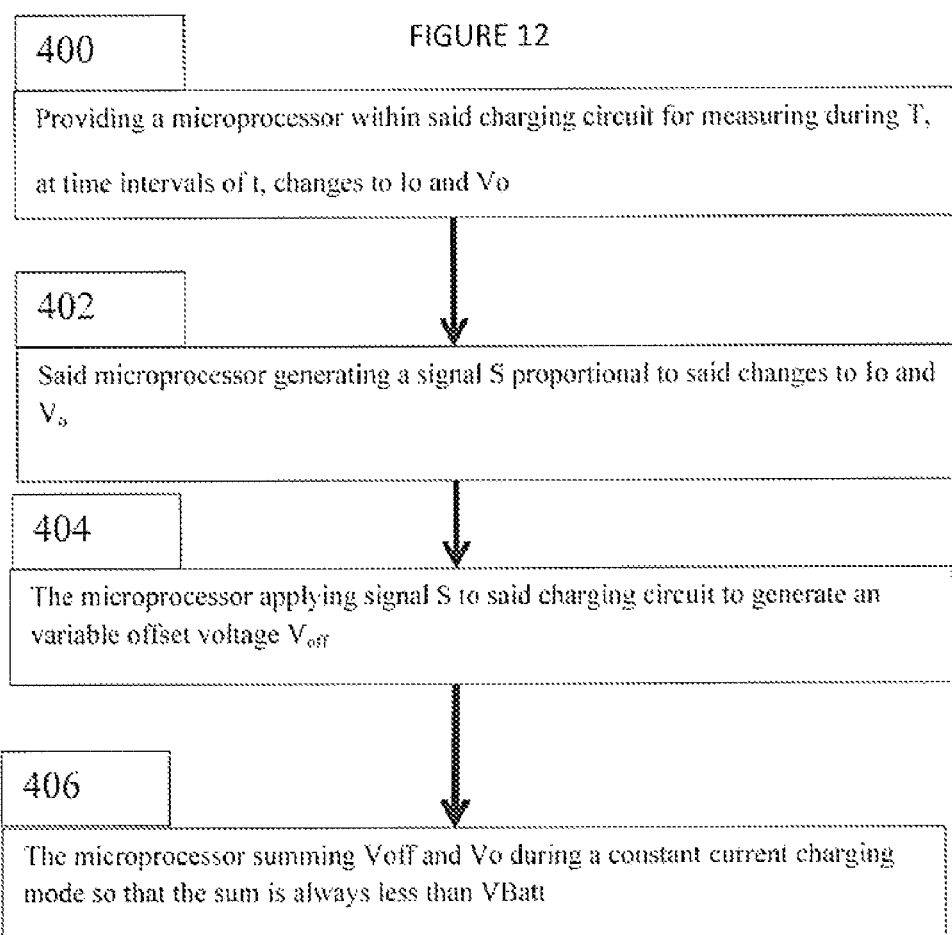

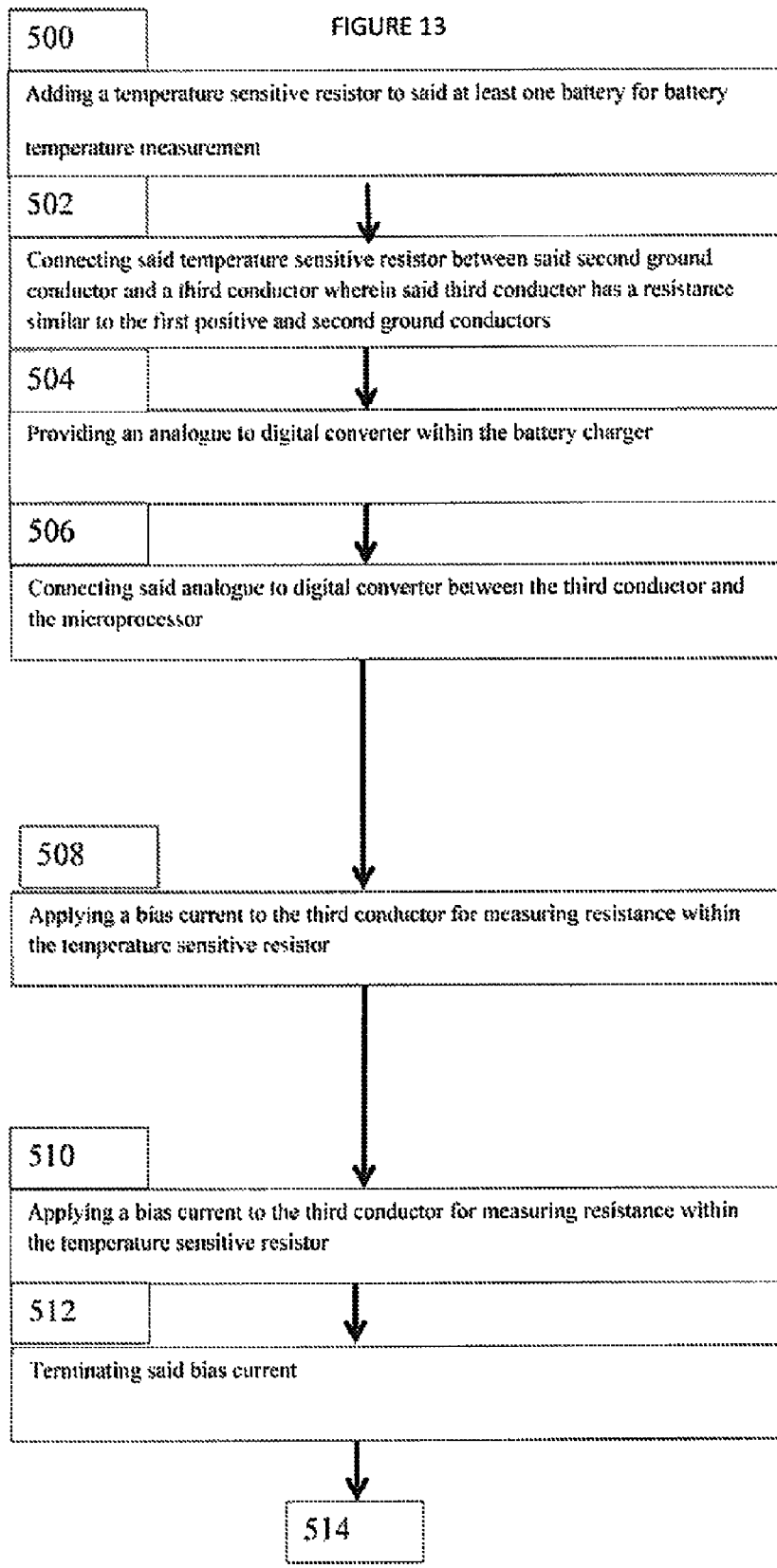

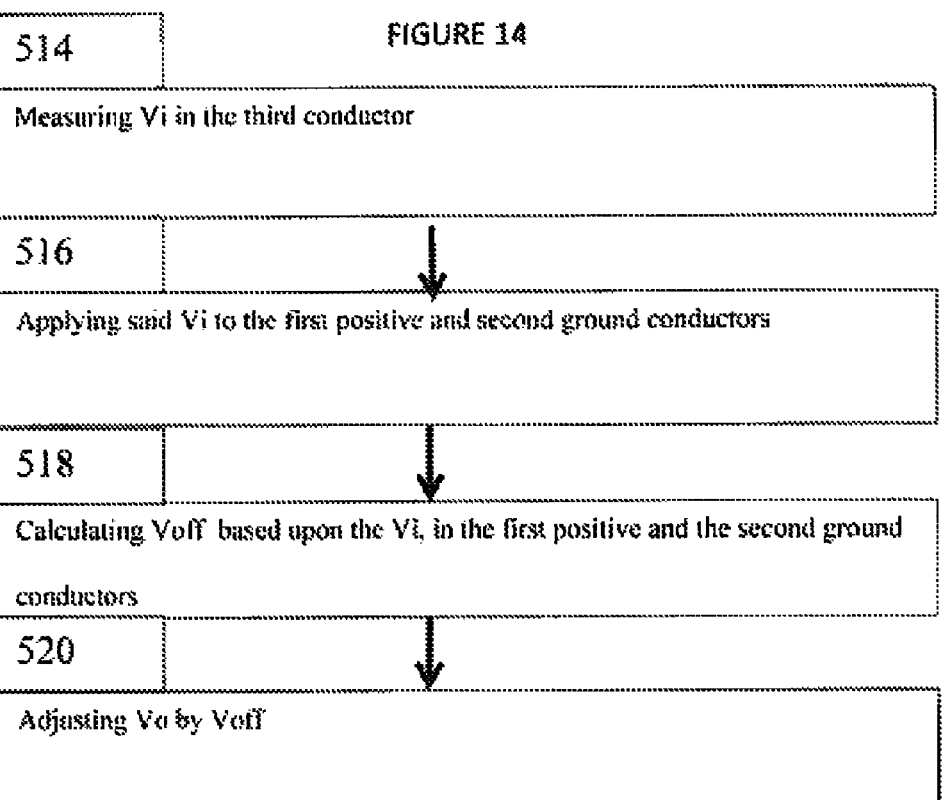

REMOTE BATTERY CHARGING SYSTEM WITH DYNAMIC VOLTAGE ADJUSTMENT AND METHOD OF USE

BACKGROUND OF THE INVENTION

Different rechargeable battery technologies require different charging techniques. A popular battery charging technology is called CCCV or Constant Current Constant Voltage charging. This charging technique uses a controlled current to recharge the battery during the first phase of charging. As the battery nears fully charged the charger voltage reaches a point where it is limited and the current is allowed to fall. This method of charging is most commonly used in ion-exchange systems such as Lithium Ion based batteries.

Systems currently in use fall into two broad categories, hardware based "dumb" chargers which use discrete circuitry to control the CCCV system, or "smart" chargers which communicate with the battery through a digital communication path, or use four-wire voltage sensing at the battery terminals to precisely set the current or voltage outputs from the charge system.

Dumb chargers have the advantage that they are very low cost and are easier to develop. The current is measured and regulated as it exits from the charger system and the voltage is measured at the output of the charger system. The disadvantage of the dumb charger system is that it works best when closely coupled with the battery itself. Therefore operating a dumb charger in a housing that is separated from the battery (such as a charger cradle for a phone) results in a voltage difference between the output terminals of the charger and the battery itself. This can result in longer charge times and reduced charge capacity as the battery charging may terminate early.

Dumb chargers have been improved by implementing a four-wire connection, in this case charge current to the battery is provided on two wires, and the voltage at the battery is measured and returned to the charger on two separate wires. This allows voltage drop in the wires to be compensated for in a very precise way. A four wire system is very accurate and fast at charging the battery and can be used in cases where the charger is separated from the battery by long wires. One disadvantage of this system is the added cost and complexity of the wiring and connectors which now have double the number of conductors. A second disadvantage of this system is poor safety as problems with the returned voltage signal such as broken wires, or current leakage such as from moisture on the connector, can cause the charger system to mistakenly output too high a voltage.

When Lithium based batteries are charged with too much voltage, even just 1% higher than their normal rating, their chemistry can become unstable and in extreme cases the batteries may become hot, vent or even catch fire.

Smart charger systems have the advantage that the battery voltage, charge state and current can be read digitally over a communication bus, therefore resulting in the highest level of safety possible. Charge current can be maximized, thereby reducing charge time. Loss of digital communication can be used as a signal to the charger to disable charging completely which also improves safety. The principle disadvantages of a smart system lie in the cost and complexity. Development time of a smart system tends to be quite long, the system requires multiple micro-controllers (one in the battery and one in the charge system at a minimum) and the number of connections required to the battery is high, often as many as 5 total connections. A further disadvantage of the system lies in the reliance on multiple micro-processors each running embedded software which may have design bugs that could result in an unsafe condition.

There exists a need for a system that provides rapid charging in a CCCV based system without sacrificing safety, and without increasing the number of connections required, especially when used to charge a battery through long wires. There further exists a need for a system that fills the void between a completely "dumb" charging system and a completely "smart" charging system.

SUMMARY OF THE INVENTION

In a preferred embodiment of the invention there is provided a system that, through the use only of discrete hardware elements and no software control, can improve the performance of a dumb charging system that connects to a battery that is separable from the charging system through only two long wires, with no remote sensing of any kind.

The preferred embodiment uses a voltage translator circuit that monitors the output current of the charging circuit and uses this signal to modify the output voltage with a variable offset which will partially compensate for voltage loss in the wires and connectors leading to the battery. In particular the variable offset is proportional to charging current and will reduce to zero volts before the charging current reduces to zero amps, in this way proper accuracy levels are maintained at the termination of charging. In this system, the amount of compensation must be less than or equal to the expected requirements of the wires and connectors leading to the battery, but the precise value cannot be determined, and therefore the compensation will not be as good as an ideal four-wire sensing system. We call this a Blind Compensation Charger System because the amount of compensation is fixed at a compromise level.

In an alternative embodiment of the invention, a microprocessor is incorporated which monitors the charging current and/or voltage and can modify the output voltage and/or current of the charging circuit thereby increasing flexibility of the dynamic adjustment. The microprocessor has the ability to apply one set of charge parameters and measure the output, it may then set a second set of charge parameters and measure the output changes to determine the compensation required to dynamically adjust the system in a way that can closely match the performance and control normally associated with a four-wire battery charger system. We call this a Dynamically Compensated Charger system.

In still another embodiment of the invention, a microprocessor is used to sense the battery pack temperature through a temperature sensitive resistor located inside the battery pack and electrically connected to a third battery pack connection wire. The system also uses said third battery pack connection to sense the true voltage drop between the charger system and the battery pack on one wire. Very little current flows through this third wire which allows it to sense the offset on the other high-current carrying wires leading to the pack. By doubling this sensed voltage drop on one wire and adding the offset to the output voltage of the charger, a further improvement in charging time and voltage accuracy can be gained at the expense of a third connection to the battery pack, which is often incorporated for thermal safety in many situations and therefore is not seen as an additional cost in most cases. The use of a single wire for compensation is safer than a dedicated sense wire because the reliability and resistance of the connections are tested when this connection is used for its original function of measuring temperature. If this third wire is damaged or making a poor connection, this will be measured as part of the temperature sensor's resistance and will therefore be interpreted as a change in temperature. In the case of a standard 10K NTC Thermistor, an open wire will be interpreted as an extremely cold battery which will result in charging being disabled. Compensation through a third wire connection has been implemented in other products and technologies as a way to estimate voltage drop in a system which would normally have four wires. However, the use of a connection that is normally used for temperature monitoring, and multiplexing the use of this third connection between both functions, and relying on the temperature monitoring function to also verify the reliability of the connection is unique. We call this a Multiplexed Third-Wire Compensated Charger System.

OBJECTS AND ADVANTAGES OF THE INVENTION

It is an object of the present invention to provide a battery charging system that can dynamically adjust its output voltage in a way that is proportional to the output current in order to compensate for voltage loss in the wires and connectors leading to the battery, without use of sense wires leading to the battery.

It is a further object of the invention to provide a battery charging system that can dynamically adjust its output current and/or voltage and measure output current and/or voltage in a way that allows the required compensation to be calculated and applied to the system to compensate for voltage loss in the wires and connectors leading to the battery, without the use of any sense wires leading to the battery.

It is a further object of the invention to allow a temperature sensing connection, normally found in battery packs, to be used in a way that allows voltage loss in the wires leading to the battery to be measured, thereby expanding the use of the third wire leading to the battery without sacrificing the original intent of the temperature monitoring third wire.

It is a further object of this invention that the overall safety and reliability of the system remain unchanged or be increased when compared to the current state of the art systems which rely on multiple processors, digital communications or multiple sensing wires leading to the battery pack.

DESCRIPTION OF THE DRAWINGS.

FIG. 10 is a table showing one method of the invention.

FIG. 11 is a table showing another method of the invention.

FIG. 12 is a table showing yet another method of the invention.

FIG. 13 is a table showing another method of the invention.

FIG. 14 is a continuation of FIG. 13.

DETAILED DESCRIPTION

Figure 1:
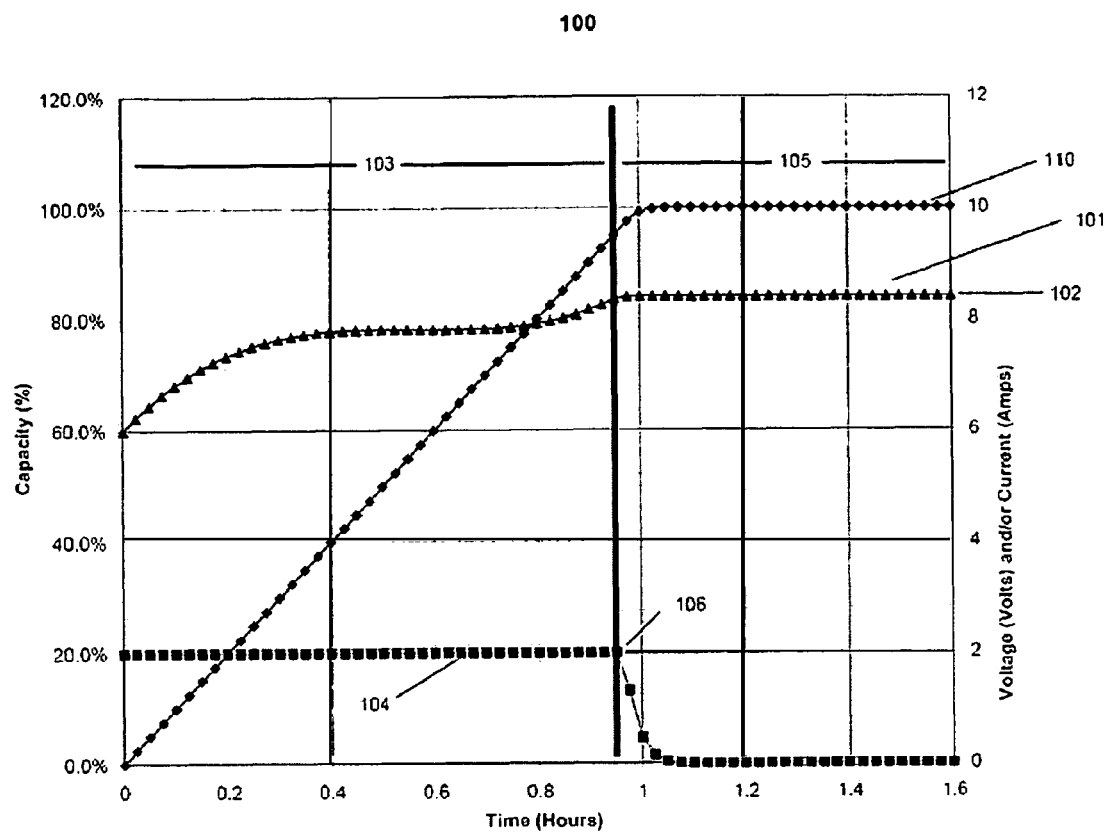
FIG. 1 is a graph of an ideal charger performance for a Lithium battery.

Referring to FIG. 1, a graph (100) showing ideal charger performance when connected to a lithium battery. In this case the output voltage $V_o$ (101) of the charger is exactly the same as the voltage present on the battery terminals $V_{Batt}$ (101). In the case of a two-cell Lithium Polymer battery where the end-of-charge voltage is 8.4 volts (102), the desired maximum charge rate is 2 amps and the battery capacity is 2 amp-hours, the graph shows what characteristics make this an ideal charger.

The graph is divided into two sections. In the Constant Current (CC mode) section (103), the battery voltage is lower than 8.4 volts so the charge current (104) will be exactly 2 amps. Once the battery reaches 8.4 volts the system enters Constant Voltage (CV mode) (105). In an ideal case a "knee" is formed (106) in the graph where the charging current $I_o$ immediately and rapidly begins to fall. This happens at the point where the battery voltage (101) reaches 8.4 volts. The total charge time (T), in this example case where the applied charge current $I_o$ is equal to the battery capacity, with a lithium polymer battery could be around 1.2 hours. It can be easily understood that applying a higher charge current $I_o$ will result in faster charging, and a lower charge current $I_o$ will result in longer charging. But in any case, with any charge current, lithium based technologies will still have two distinct charge regions as outlined above. In particular, for this example, at the point where the system transitions from CC mode to CV mode of operation, the battery capacity (110) will be at about 95% and after 1 hour of charging the battery will be at 99.1% capacity. These two points will be used for comparison with the other methods that form part of this invention. A person skilled in the art will recognize that the exact graph shape, voltages and charging times will vary from battery to battery and depending on the battery technology being employed. The benefits of the inventions disclosed herein will vary for different battery technologies and charge rates and in some cases the results may be better than anticipated here, especially with higher charge rates, long charging wires and shorter charge times. In some cases, especially low charge rates, or where the charger and battery are integrated into the same physical housing, the advantages may not be significant.

Figure 2:
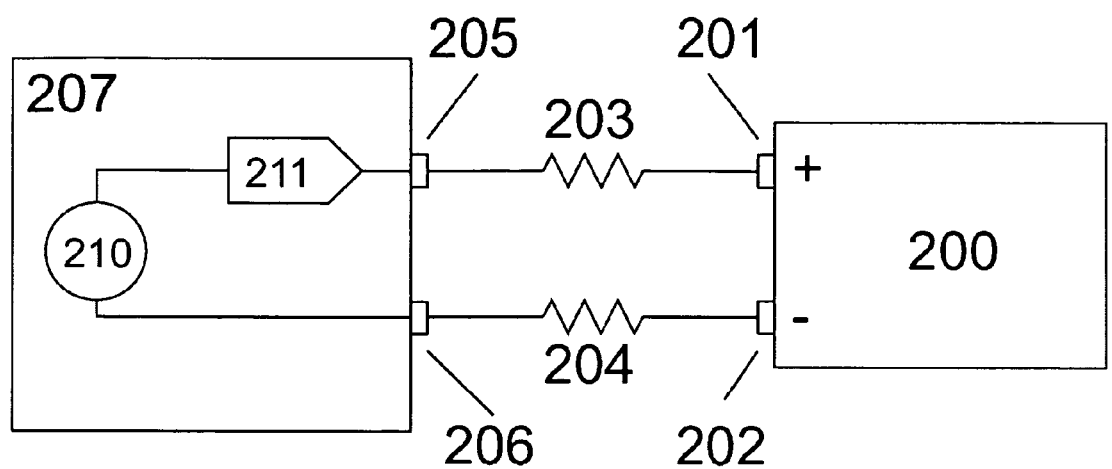
FIG. 2 is a block diagram of a battery connected to a "Dumb" charger.

Referring to FIG. 2, a charging circuit is shown that would normally constitute the simplest complete system possible. A battery (200) may be any type of rechargeable battery which is connected to a charger (207) through at least two wires and at least one pair of connectors. The connectors may be located on the positive terminal (201) and negative terminal (202) of the battery (200) or they may be located at the positive output (205) and negative output (206) of the charging circuit, or the system may contain all four connections. It would be obvious to one skilled in the art that an individual connection or wire may be replaced with multiple or larger individual connectors to increase current carrying capacity or to decrease voltage losses. FIG. 2 also shows two equivalent resistances which represent the resistance of the positive wire (203) and the resistance of the negative wire (204) as well as any interconnections in series with these elements. These resistances are shown schematically and will be distributed along the length of the wire and will vary depending on the length, diameter and overall conductivity of the wire itself. It is well understood in the art that every wire and every connection will contribute to the overall inherent resistance $R_i$ found in the system. Therefore the total resistance between where the charger monitors it's output voltage and where the battery cells receive charging voltage is equal to the sum of all resistances including all four connections (201, 202, 205, 206) and both wires (203, 204).

FIG. 2 also shows the internal details of the charger system. A constant voltage source (210) connects to the output terminals (205, 206) through a current limiter (211). When the battery (200) voltage $V_{Batt}$ is less than the constant voltage source $V_o$ (210), then current $I_o$ will flow through the current limiter (211) up to the maximum value allowed by the limiter. If the battery (200) has reached the same voltage as the voltage source (210) then the current in the system will be determined by the chemical characteristics (sometimes called the charge acceptance) of the battery itself and the current limiter (211) will not do anything to restrict this current as it falls below the limiting range.

If the resistances $R_i$ shown in FIG. 2 were all zero, then this system would produce the ideal graph previously shown in FIG. 1. However, the system resistances mean that additional voltage drops $V_I$ exist in the system resulting in a difference between the constant voltage source (210) and the actual voltage presented on the battery (200) itself.

The voltage drop can be found by the simple formula of $V_I = I_o \times R_i$ where $V_I$ is the voltage loss, $I_o$ is the current flowing and $R_i$ is the total resistance in the system. Considering a representative system consisting of a 2-cell Lithium Ion battery pack. The charging voltage for the pack should be between 8.3 and 8.5 volts for maximum capacity. This is a very tight tolerance to reach, but is necessary for many similar ion-exchange based technologies. At voltages lower than 8.3 volts this pack may suffer 20% or more capacity loss. At voltages higher than 8.5 volts the chemistry inside the battery begins to become unstable and therefore safety is compromised, the charger voltage will therefore normally be set at 8.4 volts in this example.

It will be appreciated from one skilled in the art that different battery technologies will have different thresholds, accuracy and safety requirements.

Further, by example, a battery may require 2 amps of charging current. It is also common for removable electrical connections to have 0.05 ohms of resistance and for a meter of wire to have 0.1 ohms of resistance. Therefore the total resistance in a system with two wires and four connections would be $R_i = (2 \times 0.1) + (4 \times 0.05) = 0.4$ ohms. At 2 amps of current flowing the total voltage drop $V_I$ will be 0.8 volts. If the charger has an output voltage set at 8.4 volts, then at full current the battery will only "see" 7.6 volts which is too low for proper charging. The result is that the battery charger current $I_o$ will start to drop off when the battery is only partially charged and this current drop will be interpreted as indicative of a fully charged battery, even though it is only partially charged.

Figure 3:
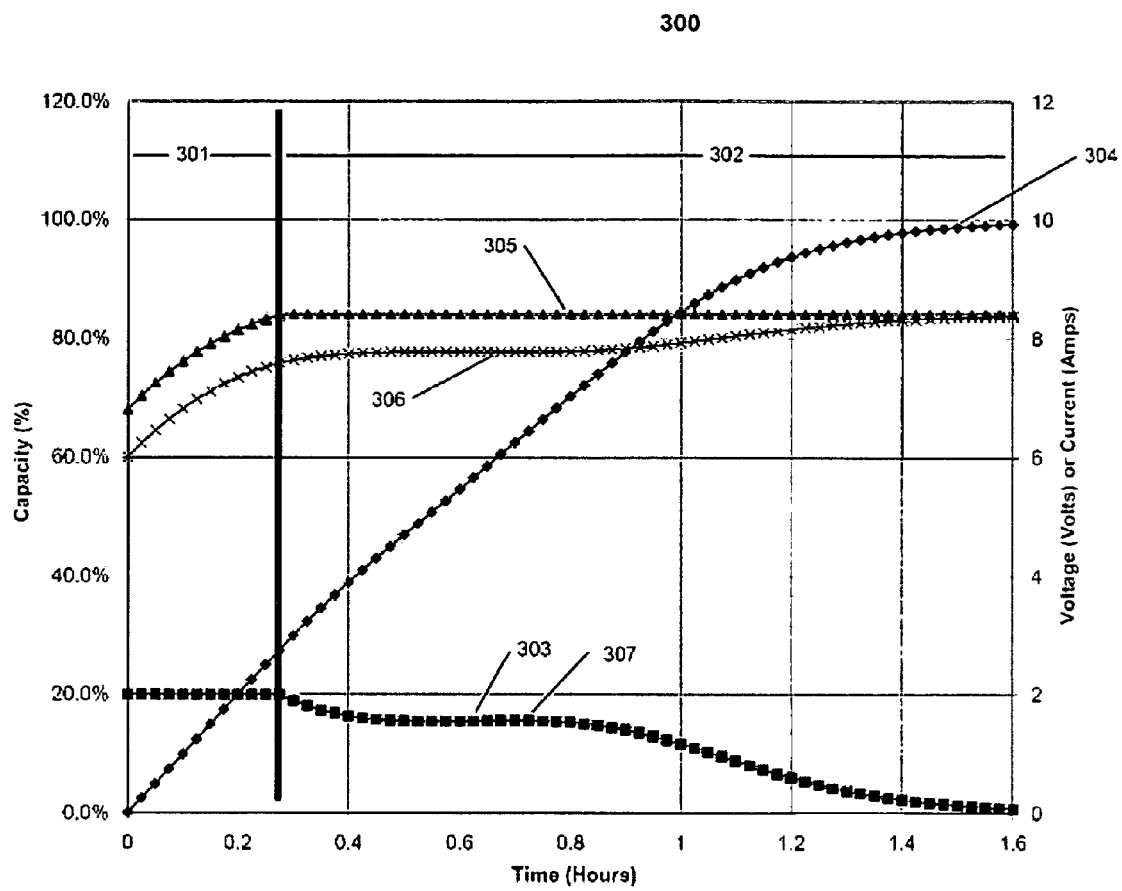
FIG. 3 is a graph of a charger performance for a "Dumb" charger.

FIG. 3 shows a representative graph (300) of the performance for the dumb charger system as shown in FIG. 2 when system resistance is taken into consideration. The graph is divided into a CC mode section (301) and CV mode section (302). The CC mode section lasts for a much shorter time than the section shown in the graph of FIG. 1. The charge current (303) is shown in this graph as well as the battery capacity (304). The charger output voltage (305) is not the same as the battery terminal voltage (306) due to the system resistances and charging current. The charger output voltage will be equal to the battery terminal voltage only when the charge current has fallen to zero. The sharp knee of charger current (106) originally seen in FIG. 1 has been replaced with a soft complex curve (307) and a long period of reduced current that gradually tapers off to zero. The current initially drops off when the charger voltage (305) first reaches the set point of the constant voltage source (210) of FIG. 2. However, this occurs before the battery voltage has reached this level, the result is that the charger transitions from CC to CV mode at a point where the battery capacity (304) is only 30% charged (in this example). The reduced charge rate results in a much longer charge time of approximately 1.6 hours for this example.

Figure 4:
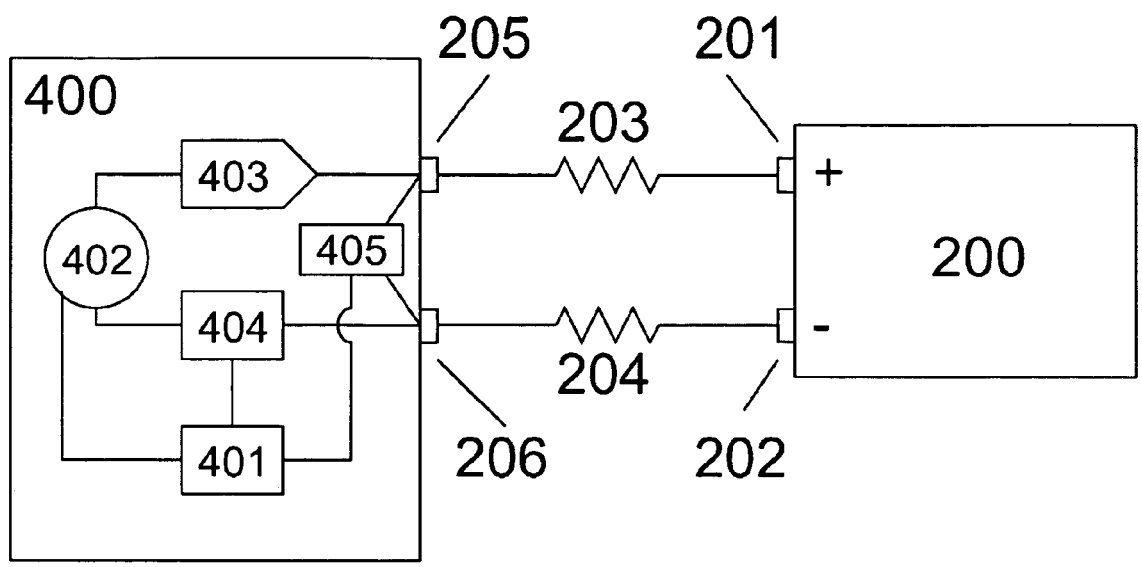
FIG. 4 is a block diagram of a Dynamically Compensated Charger System.

FIG. 4 shows a block diagram of a Dynamically Compensated Charger (400) connected to the same battery (200) using the same wires and connectors (201, 202, 203, 204, 205, 206) previously shown in FIG. 2. The Dynamically Compensated Charger (200) contains a micro-controller (401) and has an adjustable voltage source (402) and current limiter (403). It can be appreciated that one skilled in the art can implement the adjustable voltage and current sources in a variety of ways, these may be switched-mode or linear-mode regulators, they may be combined in to a single current limited voltage element or the order of these elements may be reversed, or a voltage limiter may be used instead of voltage source. The micro-controller (401) also monitors the output current using a current monitor (404) and monitors the output voltage using a voltage monitor (405). It is understood that the current monitor may be implemented using a variety of methods well understood in the art including a current to voltage converter (resistor), amplifier, sensor, coupler, current mirror, hall effect sensor or optically isolated system. Similarly the voltage monitor may be implemented using a variety of techniques including voltage ladders, dividers, amplifiers, couplers and isolators. If the system is operating in CC mode, then there is no need to adjust the voltage or current as the system is presumed to be supplying the maximum allowed charge current. At the point where an uncompensated system would normally transition to CV mode, micro-controller can perform a check to determine if the output voltage may be adjusted in order to safely optimize the charge being delivered to the battery. The micro-controller will measure the output voltage and output current, the system will then adjust the output voltage by a small amount and repeat the measurement of output voltage and current. The difference in voltage is 'dV' and the difference in current is 'dI'. The system resistance 'R' can then be estimated as 'dV/dI'. Using the absolute value of the charging current 'I', the difference in the charger output voltage and the actual battery terminal voltage can be estimated as 'V=IR'. The system desires the battery to be charged at a voltage that is appropriate for the chemistry and number of cells, in this example we use 8.4 volts. The micro-controller can then adjust the output voltage of the system to a level that is higher than the battery by the compensation amount, in such a way that the battery terminal voltage remains below 8.4 volts, which is the maximum allowed voltage on the battery terminals. The system resistance test can be periodically repeated to ensure that accuracy is maintained. As the battery voltage rises to 8.4 volts, the charger will enter CV mode, but with the charger set at a voltage that is higher than 8.4 volts. As charging current drops the compensation voltage will be reduced by the micro-controller proportionally which in turn maintains the 8.4 volt level at the battery terminals. To ensure maximum accuracy of the system, it may be desirable to cease providing compensation once the charge current has fallen below a certain threshold. Certain limits on the compensation limit can also be included to ensure that poor connections do not result in an unreasonably high amount of compensation voltage being applied to the batteries. This maximum compensation value would be determined on a case by case basis based on the maximum expected charge current and resistance values.

From a safety perspective, the dynamically compensated charger offers superior safety when compared to a four-wire remote voltage sensed charge system. The dynamic compensation system utilizes the same wires and connections that are being used for supplying power to the battery, therefore if there is a flaw in these connectors or wires it will impact both the delivery of power and the sensing of the power making error detection safe and effective. The dynamic compensation system will also be more accurate as the system resistance is based on all resistances in the system. A four-wire system only compensates for resistances up-to and including the point where the sense-wires are connected. The battery pack itself may still contain some residual resistance sources including the individual cell connections themselves, any connection wires, fuses and other protection circuitry may also impact accuracy.

It would be clear to someone skilled in the art that dynamically adjusting the charging parameters based on dynamically varying and measuring the output of the charger itself can be accomplished using a variety of methods and parameters. In particular, the charger current itself could be varied from zero (cut off) to the maximum value in a step function, or other variation levels and wave shapes may be used on both the current and voltage set points in order to determine the compensation requirements of the charger in order to optimally deliver energy into the battery.

Figure 5:
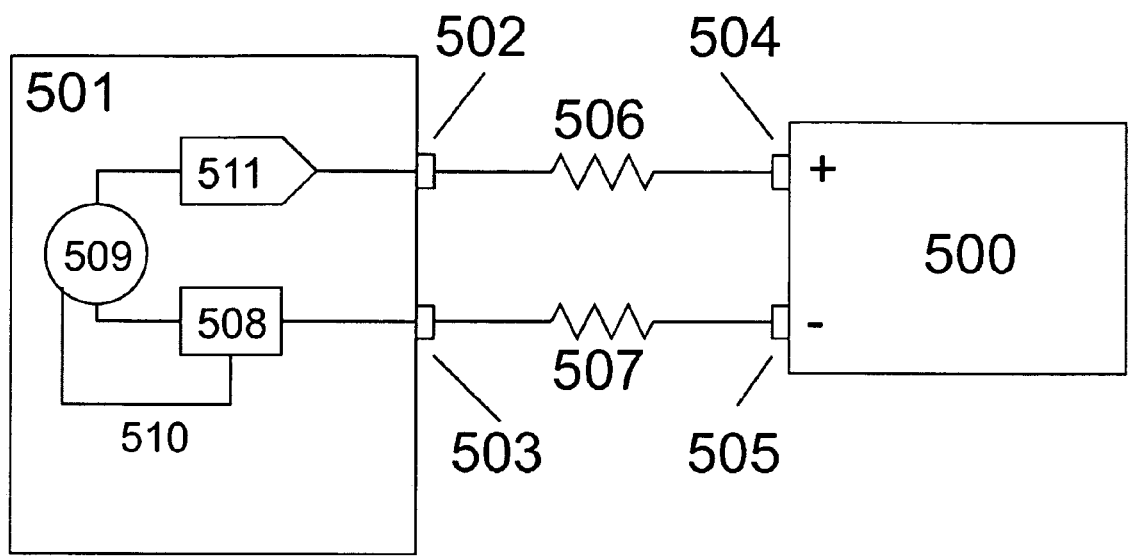
FIG. 5 is a block diagram of a Blind Compensated Charger System.

FIG. 5 is a block diagram of a Blind Compensated Charger. In this case the charger (501) is set with an approximate value of the total resistances expected to be found in the system, even though it cannot actually see these resistances, hence the term "Blind" is used. The resistances would include all of the connectors and wires (501, 502, 503, 504, 505, 506) previously shown in FIG. 2. This charger contains a fixed current limiter (511) and uses hardware or software means to measure the output current using a current monitor (508) and uses that current to modify the output voltage setting for the voltage source (509) through a mathematical summing node (510) which could be constructed from hardware using resistors and amplifiers, or by software using a microcontroller. By example, if the total resistance of the system was expected to be 0.5 ohms, and the maximum charge rate was expected to be 2.0 amps, then there is a potential for the output of the charger to be 1.0 volts lower than the terminal voltage of the battery (500). Using hardware or software the system can measure the output current and convert it at the mathematical node (510) into a control signal to the voltage source (509) which causes the output voltage of the source to rise by 1.0 volts. In reality a lower voltage would be used to ensure safe operation. Additionally, a provision could be made to remove the compensation, or set it to zero, when the charge current drops below a certain threshold, this allows the system to rapidly charge the battery during the first stages of charging, but to enter a more conventional, and therefore safer, mode of constant-voltage charging as the battery reaches a fully charged state.

Figure 6:
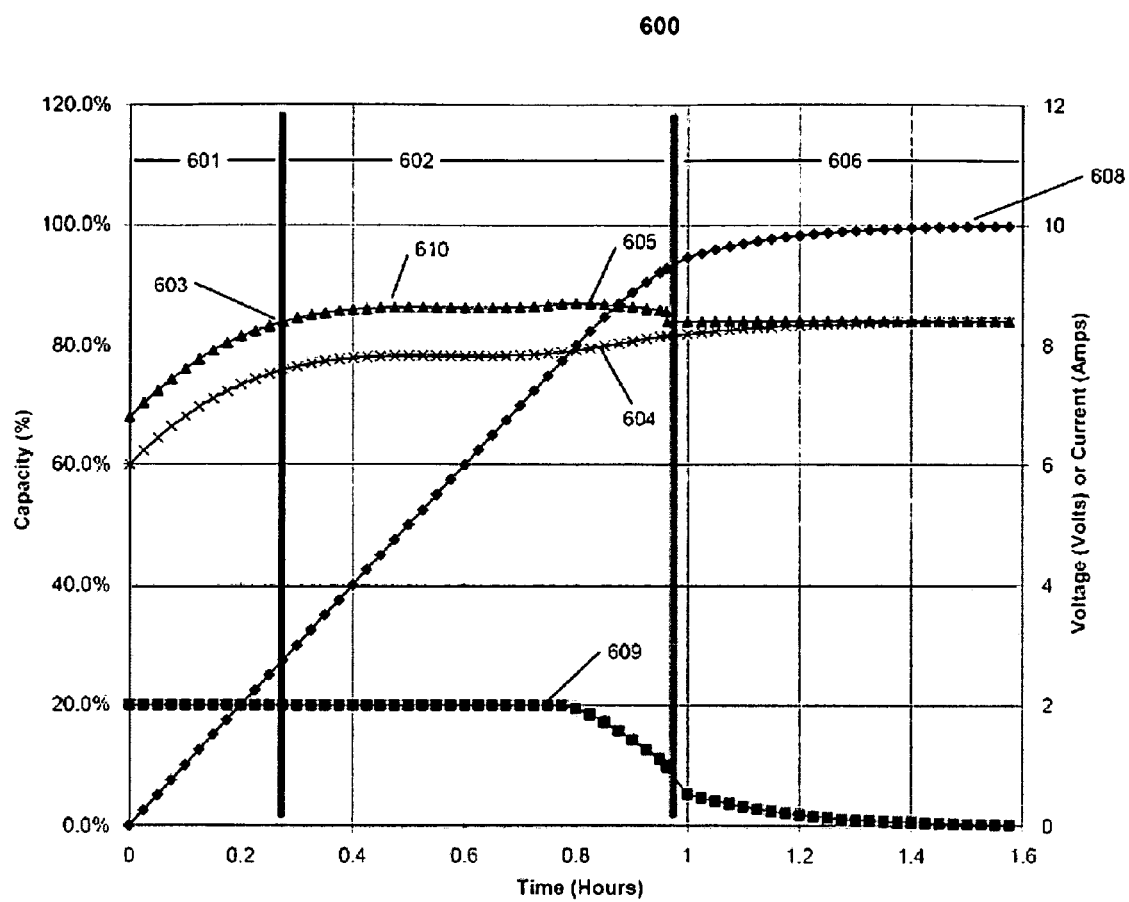
FIG. 6 is a graph of a charger based on Blind Compensation.

FIG. 6 shows a graph (600) of a Blind Compensated charging system. The conventional CC region (601) of the graph is quite small, much like the non-compensated "dumb" charging graph of FIG. 3. The system switches over to a compensated region (602) at the point where the charger output exceeds the normal set point of 8.4 volts (603), the charger output continues to rise to a maximum value, in this case the charger set point is raised $1/10^{th}$ the value of the current, therefore about 0.2 volts. The charger voltage therefore rises to a maximum level (610) of 8.6 volts where it remains until the end of the compensation region. The battery voltage (604) continues to rise as it charges and eventually the voltage difference between the charger voltage (605) and the battery voltage (604) is too small for the system to continue to deliver full current. At this point the charge current (609) begins to taper off which causes a corresponding drop in the amount of compensation causing the charger voltage to also drop. The example shown assumes the compensation will be switched off (set to zero) when the charger current falls below 1 amp; at this point the charger switches over to a conventional CV mode (606) and continues charging the battery with a fixed voltage at the output of the charger of 8.4 volts.

The Blind Compensation method shown here as an example would charge the battery capacity (608) to 93.4% after 1 hour which is much better than the un-compensated "Dumb" charger, but not as good as the Dynamic Compensated or the Ideal charge examples.

Figure 7:
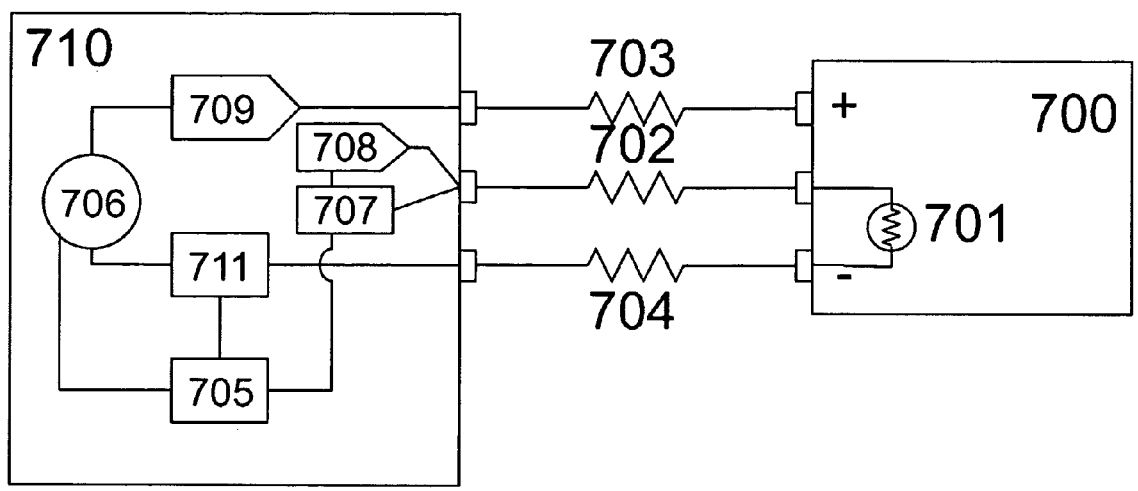
FIG. 7 is a block diagram of a battery which contains a temperature sensor connected to a charger based on Multiplexed Third-Wire Compensation.

FIG. 7 shows a battery pack system (700) that contains a safety thermistor (701) connected in a way that is standard practice in the battery industry. However, this also enables its use in a more inventive way, to also create a compensated charger system called a Multiplexed Third Wire Compensation system. The thermistor changes resistance based on the temperature of the pack and is often used as a backup safety sensor. A number of battery standards, including the SMBus Standard provide specific details on the type and connection strategy that must be employed for such a sensor. Normally this resistor is connected to the battery ground terminal. The third wire (702) which leads to the thermistor will have resistance that is similar to the other wires (703, 704) in the system, however, the current normally used to read the thermistor, and the magnitude of the wire resistance when compared to the resistance of the thermistor itself is quite small. The pack will also contain multiple connectors similar to those shown on other figures (not labeled for clarity). The Third Wire Multiplexed Charger (710) contains a current limiter (709) and a current monitor (711) which connect to a micro-controller (705) which is shown controlling the voltage source (706) and connecting to the third wire (702) through an Analog to Digital (A/D) converter (707) and with a current bias supply (708) which may be enabled or disabled. The bias supply can be constructed in a number of ways and essentially applies a known current to the third wire which, when combined with the resistance of the thermistor in the battery pack will produce a voltage at the A/D converter of the microprocessor.

When the battery is charging, a voltage drop is generated on the supply wires feeding the battery pack. The battery charging current is several orders of magnitude higher than the bias current that is used to measure the thermistor resistance. In particular the current flowing through the ground wire (704) causes the ground voltage of the battery pack to be higher than the ground voltage of the charger. The offset voltage is a function of the current flow multiplied by the total connection resistance, including all connectors, wire and other sources of resistance in the ground side of the system. If the micro-processor turns off the bias supply to the third wire leading to the pack, then this ground voltage offset can be read by the A/D converter of the microprocessor through the third wire (702) without error. There is essentially no voltage drop on this third wire because negligible current will flow in this wire. Depending on the construction of the battery pack, connector and wire harnesses, a mathematical formula can easily be created that allows this ground offset voltage to be used to also estimate the offset voltage that would be present on the positive supply wire (703). In the case where the wire length, size and connectors are the same for both of the supply wires, then the ground offset can be assumed to be equal to the positive supply offset. In the case where, for example, the ground wire is composed of two discrete wires and connectors in parallel, compared to a single wire and connector for the positive wire, then clearly the positive wire will have double the resistance of the ground wire, and therefore the offset will be approximately double what is measured on the ground wire. Combining the measured ground offset with the calculated positive offset results in an accurate total compensation voltage which can be applied to the voltage source. The ground offset can be periodically measured, especially as the battery nears fully charged state. The temperature of the battery pack can also be periodically measured on the same wire by applying a small, known bias current to the wire which will create an additional voltage offset which is proportional to the value of the thermistor resistance, and therefore the temperature of the battery pack.

It can be appreciated that in a system where the temperature sensor was connected instead to the positive wire (703) or where the temperature sensor (701) were composed of a different material such as a thermocouple, the method of removing the bias current, reading the voltage drop of one wire (in this case with reference to the positive supply instead of the ground) and then mathematically calculating the total expected voltage drop in the system would still apply.

Figure 8:
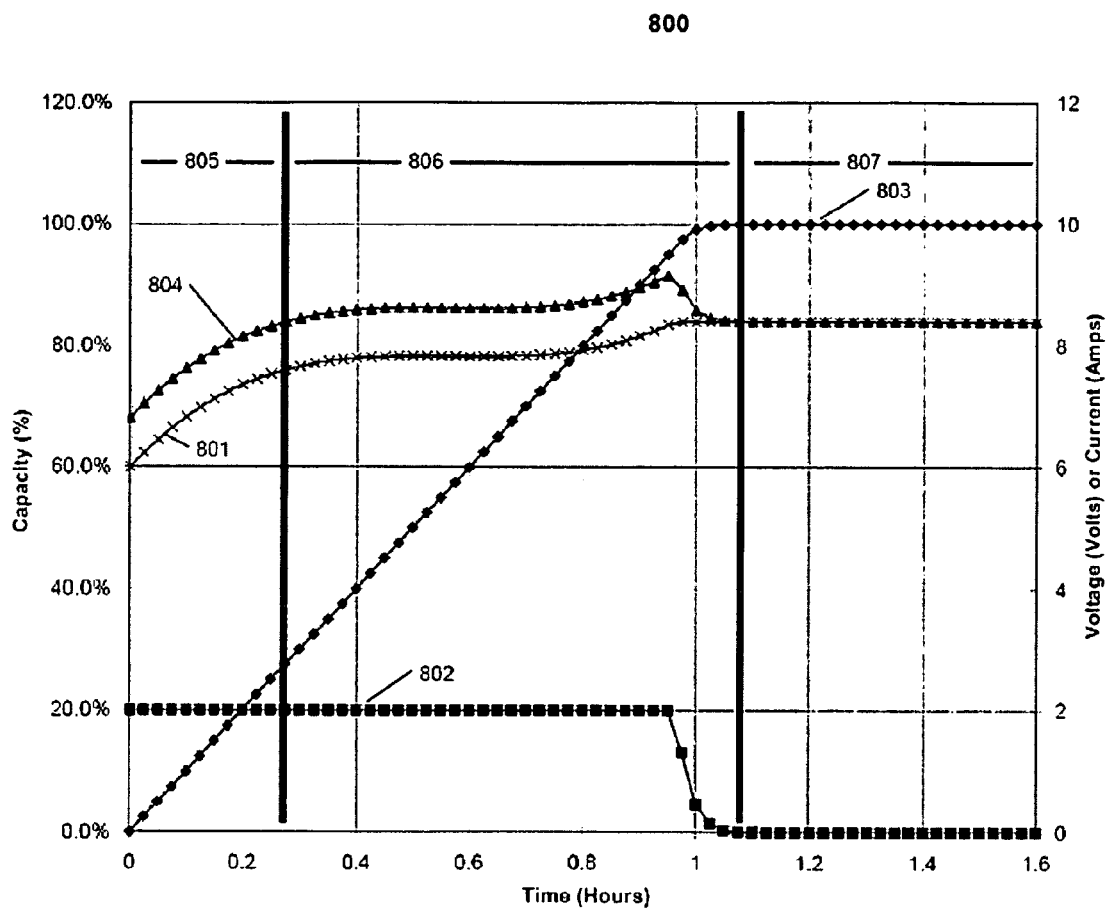
FIG. 8 is a graph of a charger based on Multiplexed Third-Wire Compensation.

FIG. 8 shows the expected performance graph (800) for the Multiplexed Third Wire Compensation strategy. The battery voltage (801), battery current (802) and battery capacity (803) have the same magnitude and shape as the ideal charger graph of FIG. 1. The only difference is that the charger output voltage (804) is now accurately compensated and will actually rise beyond the normal 8.4 volts allowed to charge a two cell lithium battery pack. The charger output rises the exact amount required to overcome the losses in the connections between the battery pack and the charger. As the battery nears a fully charged state the measured voltage offset, and therefore the voltage compensation applied to the voltage source is automatically reduced. By the time the battery has reached a fully charged state, current has fallen to nearly zero, and therefore the charger output voltage become equal to the battery voltage at 8.4 volts. In particular, the charging current flow in the CC area (805) of the graph looks identical to the Compensation area (806). The CV area of the graph (807) only occurs once the battery is fully charged (current has reached zero), which essentially means that the CV portion of battery charging employed by the current state of the art systems has actually been eliminated in this invention. It has been replaced by the actively compensated area (806), yet the overall charge time is identical to an ideal (and therefore previously not-achievable) system.

Figure 9:
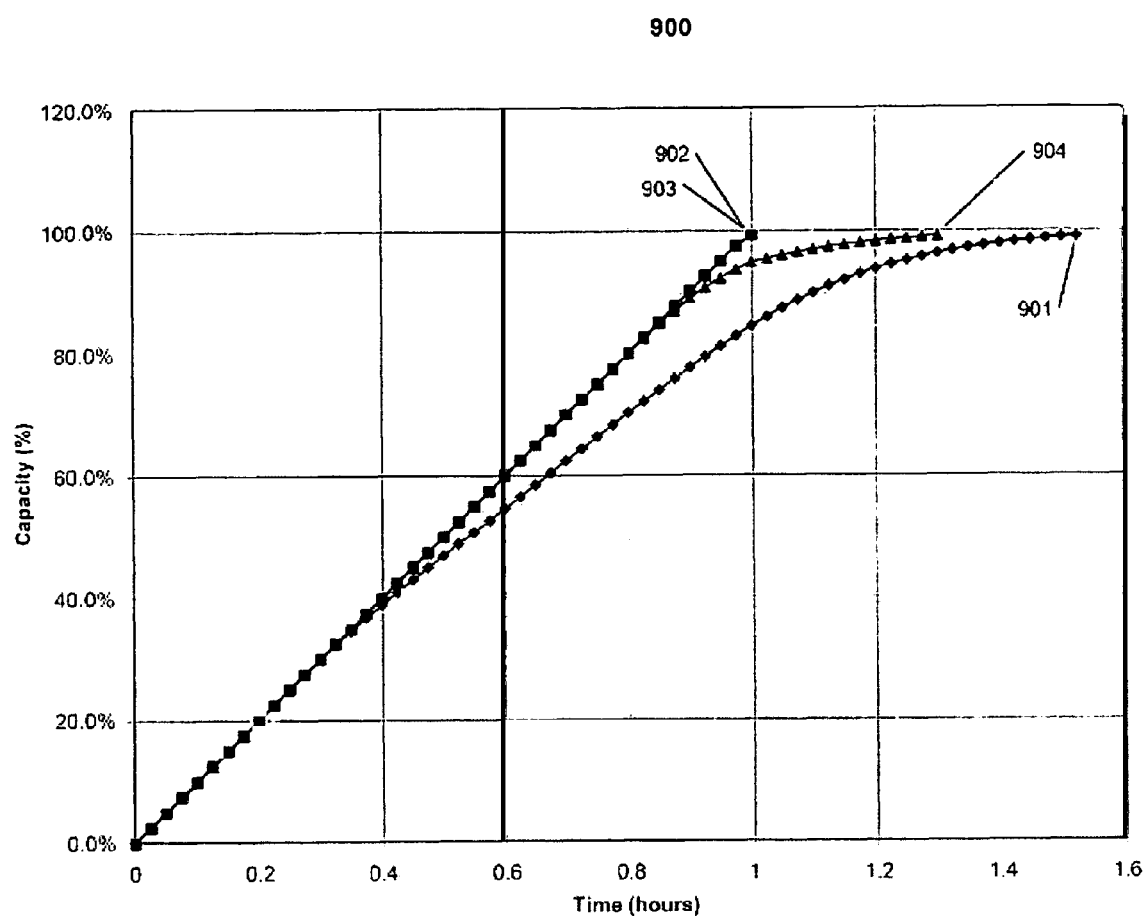
FIG. 9 is a graph of the expected charge times for the four different charging methods.

FIG. 9 shows a graph (900) of the battery capacity versus time for each of the charge compensation methods presented. The charging parameters of a two cell, 2 amp-hour battery pack being charged with an 8.4 volt, 2 amp charger are the same for each example, yet the time required to charge the battery pack is different based on the compensation method chosen. The originally presented "dumb "charging system (901) is the slowest, requiring over 1.5 hours to reach 99% capacity, while the Multiplexed Third Wire Compensation strategy (902) was the fastest, equivalent in fact to an ideal system (903) at about 1.0 hours to reach fully charged state. The Blind Compensation Method (904) is simple to implement without a micro-controller and results in 1.3 hours to reach 99% capacity, this may be a good compromise for some systems where a little faster charging is desired. The charging accuracy, and therefore speed, of the Blind Compensation method can he improved by accurately characterizing the resistances that will be faced in the final system, the example shown here assumed the compensation value was only 50% of the actual resistance value, therefore representation a large estimation error.

Existing state of the art lithium charging systems arc called Constant Current Constance Voltage or CCCV systems. The cases illustrated by the various compensation methods outlined in this document are all characterized by a common theme that a new charging more with Dynamic Voltage characteristics has been addled. Some of the preferred embodiments contain elements of CC and DV and CV combined. The final example of a Multiplexed Third Wire Compensation system actually eliminates the CV step from active charging: this can therefore by expressed as a CCDV charging system.

Referring now to FIG. 10 there is shown one method of the invention for dynamically compensating a battery charging system having a charging circuit for generating a dynamic output voltage and a dynamic output current for charging and at least one battery wherein the at least one battery has a thermistor and a predetermined maximum battery voltage, the method comprising the steps of:

Connecting said at least one battery to said charging circuit by a positive conductor and a ground conductor wherein said positive and ground conductors have an aggregate inherent resistance, $R_i$, causing an aggregate voltage loss $V_i$ at a current level of $I_o$ Connecting said thermistor between the second ground conductor and a third conductor Connecting a microprocessor to said third conductor Connecting an A/D converter serially between said third conductor and said microprocessor Applying a bias current $I_{bias}$ to the third conductor for measuring resistance within the thermistor Terminating $I_{bias}$ Measuring a voltage loss $V_3$ in the third conductor Calculating $V_{off}$ based upon $V_3$ such that Voff=2$V_3$ Dynamically adjusting $V_o$ by $V_{off}$ Now referring to FIG. 11 there is shown steps of a method of dynamically compensating a battery charging system having a charging circuit for generating a dynamic output voltage and a dynamic output current for charging and at least one battery during a time T and a current monitor and a voltage monitor wherein the at least one battery has a predetermined maximum voltage, the system has an approximate aggregate system resistance, the method comprising the steps of:

Setting said charging circuit to compensate for Rsys

Connecting a mathematical summing node in series with said current monitor

Measuring the magnitude of $I_o$

Measuring time T and at intervals of t, changes in $I_o$

Transmitting changes in $I_o$ to said mathematical summing node

Using the mathematical summing node to convert the changes in $I_o$ into a control signal S'

Transmitting said control signal S' to said adjustable voltage source to adjust $V_o$ by a $V_{off}$ based on changes in $I_o$ Now referring to FIG. 12 the method of FIG. 11 further comprises the following steps Providing a microprocessor within said charging circuit for measuring during T, at time intervals t, changes to Io and Vo Said microprocessor generating a signal S proportional to said changes to Io and Vo The microprocessor applying signal S to said charging circuit to generate an variable offset voltage $V_{off}$ The microprocessor summing $V_{off}$ and Vo during a constant current charging mode so that the sum is always less than $V_{Batt}$ Referring now to FIG. 13 there is shown a method of dynamically compensating a battery charging system having a charging circuit for generating a dynamic output voltage and a dynamic output current for charging and at least one battery during a time T and a current monitor and a voltage monitor said at least one battery having a predetermined maximum battery voltage, the method comprising the following steps Adding a temperature sensitive resistor to said at least one battery for battery temperature measurement Connecting said temperature sensitive resistor between said second ground conductor and a third conductor wherein said third conductor has a resistance similar to the First positive and second ground conductors Providing an analogue to digital converter within the battery charger Connecting said analogue to digital converter between the third conductor and the microprocessor Connecting said analogue to digital converter between the third conductor and the microprocessor Applying a bias current to the third conductor for measuring resistance within the temperature sensitive resistor Terminating said bias current Referring now to FIG. 14 which is a continuation of FIG. 13 the steps continued are Measuring $V_I$ in the third conductor Applying said $V_I$ to the first positive and second ground conductors Calculating $V_{off}$ based upon the $V_I$ in the positive and the second ground conductors Adjusting $V_o$ by $V_{off}$ Although the description above contains much specificity, these should not be construed as limiting the scope of the invention but as merely providing illustrations of some of the presently preferred embodiments of this invention. Any digital gates or signals may be easily redefined such that they perform similar functions as inverse logic or using alternate gates or logic topology. Logic analog detection and control means may be implemented using integrated circuitry, microprocessor control, software and wireless control. Thus the scope of the invention should be determined by the appended claims and their legal equivalents.

What is claimed is:

1. A remote dynamically compensated battery charging system having an dynamic voltage source having a system output voltage $V_O$ and a system output current $I_O$ for charging at least one battery having a maximum voltage $V_{Batt}$ over a charging time period T, said system comprising:
   a. a positive conductor and a ground conductor for connecting said at least one battery to the system, wherein said positive and ground conductors have an undetermined aggregate, and dynamic inherent resistance $R_i$ causing a dynamic inherent voltage loss $V_i$;
   b. a microprocessor for measuring, over incremental time periods t changes to $I_o(dI_o/dt)$ and changes to $V_o(dV_o/dt)$ caused by $R_i$;
   c. said microprocessor generating a signal S proportional to one of $dV_o/dt$ and $dI_o/dt$;
   d. a voltage translator circuit for receiving said signal S and calculating an incremental offset voltage $V_{off}/dt$;
   e. said voltage translator circuit adding $V_{off}/dt$ to $V_o$ thereby dynamically compensating for $V_i$ over charging period T.

2. The system of claim 1 wherein T comprises a $T_{CC}$ and a $T_{CV}$ during which times the system is in a constant current mode and a constant voltage mode respectively and a transition point between $T_{CC}$ and $T_{CV}$, so that:
   a. during $T_{CC}$ $V_{off}$ is zero:
   b. at said transition point and during $T_{CV}$ point the microprocessor:
      i. measures $V_o$ during time periods t;
      ii. calculates $dV_o/dt$;
      iii. measures $I_o$ during said time periods t:
      iv. calculates $dI_o/dt$:
      v. calculates $dR_i/dt - dV_o/dI_o$;
      vi. calculates $V_{off}/dt$ as $dR_i/dt \times I_o$: and,
   c. wherein the voltage translator circuit adds $V_{off}/dt$ to $V_o$ the result being that $V_o$ is always greater than $V_{Batt}$ during $T_{cv}$.

3. The system of claim 2 wherein the microprocessor includes a first sub-program to reduce $V_o$ during $T_{CC}$ so that $V_o$ plus $V_{off}$ is less than that $V_{Batt}$.

4. The system of claim 3 wherein the microprocessor includes a second sub-program to sum $V_{off}$ and $V_o$ during $T_{CV}$ so that Vo is always greater than $V_{Batt}$.

5. The system of claim 1 wherein the system has an undetermined, aggregate and dynamic resistance $R_{sys}$ causing a dynamic inherent system voltage loss $V_{sys}$ and wherein the least one battery includes a safety thermistor having an $R_{therm}$ said system further comprising:
   a. a current limiter connected between the dynamic voltage source the positive conductor;
   b. a current monitor connected between the dynamic voltage source and the ground conductor;
   c. said microcontroller connected to a third conductor through an A/D converter and wherein said third conductor has a biasing current source;
   d. wherein said safety thermistor is connected to the microprocessor by the third conductor having a resistance $R_3$ and a biasing current $I_{bias}$ wherein $R_3$ is negligible compared to $R_{therm}$ and $1_{bias}$ is negligible compared to $I_o$ and wherein $I_{bias}$ and $R_3$ produce a voltage $V_3$ at said analogue/digital converter;
   e. wherein when $I_{bias}$ is zero. $R_3=R_{sys}$ so that said microcontroller calculates $V_{off}$ as a function of $R_{sys}$ and adds $V_{off}$ to $V_o$.

6. The system of claim 5 wherein when the positive conductor comprises a single wire and the ground conductor comprises a first and a second parallel wires, the result being that the resistance in the positive wire is twice the resistance in any of said first and said second wires.

7. The system of claim 6 wherein the at least one battery comprises a thermistor and the microprocessor comprises a mathematical summing node in series with a current monitor and an A/D converter connected to said thermistor by a third conductor having similar resistance to the positive and ground conductors and wherein said current monitor transmits the magnitude of $dI_o/dt$ to said mathematical summing node where it is converted into a control signal S' for transmission to the adjustable voltage source to determine $V_{off}/dt$ and adjust $V_o$ dynamically over charge time T in order to optimize $I_o$ and wherein the microprocessor controls a bias current in the third conductor for battery temperature measurement, so that when the microprocessor terminates said bias current, it is able to measure a voltage loss in the third conductor and calculate $V_{off}$ as twice said voltage loss in the third conductor.

8. A method of dynamically compensating a battery charging system having a charging circuit for generating an dynamic output voltage $V_o$ and a dynamic output current $I_O$ for charging an at least one battery, said at least one battery having a thermistor and a predetermined maximum battery voltage $V_{Batt}$ said method comprising the steps of:
   a. connecting said at least one battery to said charging circuit by a positive conductor and a around conductor wherein said positive and ground conductors have an aggregate inherent resistance $R_i$ causing an aggregate voltage loss $V_i$ at a current level of $I_o$
   b. connecting said thermistor between the second ground conductor and a third conductor;
   c. connecting a microprocessor to said third conductor:
   d. connecting an A/D converter serially between said third conductor and said microprocessor:
   e. applying a bias current $I_{bias}$ to the third conductor for measuring resistance within the thermistor:
   f. terminating $I_{bias}$:
   g. measuring a voltage loss $V_3$ in the third conductor:
   h. calculating $V_{off}$ based upon $V_3$ such that $V_{off}=2V_3$: and,
   i. dynamically adjusting $V_O$ by $V_{Off}$.

9. A method of dynamically compensating a battery charging system haying a charging circuit for generating an dynamic output voltage $V_o$ and a dynamic output current $I_o$ for charging an at least one buttery during a time T and a current monitor and a voltage monitor, said at least one batter having a predetermined maximum battery voltage $V_{Batt}$ said system having an approximated aggregate system resistance $R_{sys}$ said method comprising the steps of:
   a. setting said charging circuit to compensate for $R_{sys}$:
   b. connecting a mathematical summing node in series with said current monitor;
   c. measuring the magnitude of $I_o$:
   d. measuring during time T and at intervals of t, changes in $I_o$:
   e. transmitting changes in $I_o$ to said mathematical summing node:
   f. using the mathematical summing mode to convert the changes in $I_o$ into a control signal S': and,
   g. transmitting said control signal S' to said adjustable voltage source to adjust Vo by a $V_{off}$ based on changes in $I_o$.

10. The method of claim 9 further comprising the steps of:
   a. providing a microprocessor within said charging circuit for measuring during T, at time intervals of t, changes to $I_o$ and $V_o$;
   b. said microprocessor generating a signal S proportional to said changes to $I_o$ and $V_o$;
   c. the microprocessor applying signal S to said charging circuit to generate an variable offset voltage $V_{off}$; and,
   d. the microprocessor summing $V_{off}$ and $V_o$ during a constant current charging mode so that the sum is always less than $V_{Batt}$.

11. A method of dynamically compensating a battery charging system having a charging circuit for generating an dynamic output voltage $V_o$ and a dynamic output current $I_O$ for charging an at least one battery during a time T and a current monitor and a voltage monitor, said at least one battery having a predetermined maximum battery voltage $V_{Batt}$ said method comprising the steps of:
   a. adding a temperature sensitive resistor to said at least one battery for battery temperature measurement;
   b. connecting said temperature sensitive resistor between said second ground conductor and a third conductor wherein said third conductor has a resistance similar to the first positive and second ground conductors;
   c. providing an analogue to digital converter within the battery charger;
   d. connecting said analogue to digital converter between the third conductor and the microprocessor;
   e. applying a bias current to the third conductor for measuring resistance within the temperature sensitive resistor;
   f. terminating said bias current;
   g. measuring $V_i$ in the third conductor;
   h. applying said $V_i$ to the first positive and second ground conductors: and,
   i. calculating $V_{off}$ based upon the $V_i$, in the first positive and the second ground conductors; and,
   j. adjusting $V_o$ by $V_{off}$.

* * * * *